United States Patent
Taniguchi

(10) Patent No.: US 9,264,477 B2
(45) Date of Patent: Feb. 16, 2016

(54) CALL PROCESSING TIME MEASURING DEVICE, CALL PROCESSING TIME MEASURING METHOD, AND CALL PROCESSING TIME MEASURING PROGRAM

(75) Inventor: Kunihiro Taniguchi, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 1249 days.

(21) Appl. No.: 12/745,660

(22) PCT Filed: Nov. 28, 2008

(86) PCT No.: PCT/JP2008/071666
§ 371 (c)(1),
(2), (4) Date: Jun. 1, 2010

(87) PCT Pub. No.: WO2009/069753
PCT Pub. Date: Jun. 4, 2009

(65) Prior Publication Data
US 2010/0312882 A1 Dec. 9, 2010

(30) Foreign Application Priority Data
Nov. 30, 2007 (JP) .................................. 2007-310094

(51) Int. Cl.
*G06F 15/173* (2006.01)
*H04L 29/06* (2006.01)
*H04L 12/26* (2006.01)

(52) U.S. Cl.
CPC ................ *H04L 65/80* (2013.01); *H04L 12/26* (2013.01); *H04L 12/2602* (2013.01); *H04L 43/0864* (2013.01)

(58) Field of Classification Search
CPC ..... H04L 65/80; H04L 12/26; H04L 12/2602; H04L 43/0864
USPC ......................................................... 709/224
See application file for complete search history.

(56) References Cited

U.S. PATENT DOCUMENTS

2003/0174648 A1* 9/2003 Wang et al. .................... 370/235
2003/0227912 A1* 12/2003 Kachi ................. H04L 12/2602
370/352

(Continued)

FOREIGN PATENT DOCUMENTS

| JP | 2004-015290 A | 1/2004 |
| JP | 2004-171226 A | 6/2004 |
| JP | 2005-184580 A | 7/2005 |
| JP | 2007-194764 A | 8/2007 |

OTHER PUBLICATIONS

W. Richard Stevens, "TCP/IP Illustrated, vol. 1", 1994, pp. 85-96, Chapter 7, Addison-Wesley Publishing Company.
Office Action dated Sep. 25, 2012, issued by the Japanese Patent Office in counterpart Application No. 2009-543874.

*Primary Examiner* — Jude Jean Gilles
*Assistant Examiner* — Jaren M Means
(74) *Attorney, Agent, or Firm* — Sughrue Mion, PLLC

(57) ABSTRACT

To enable the measurement of service time actually spent on the proceeding of a message out of the proceeding of messages. When a measurement-target message detecting device detects a measurement-target message, a latest transmission instruction device requests a response request message transmitting module to transmit a response request message immediately before the measurement-target message to a measurement-target node. Further, an immediate transmission instruction module requests the response request message transmitting module to transmit the response request message immediately after the measurement-target message to the measurement-target node. The response request message transmitting module transmits the response request which is a message to request a response according to each transmission request. A response message received time recording module records the received time of each of the response messages from to the measurement-target node. A processing time computing module computes the difference of the received time of each of the response messages.

6 Claims, 8 Drawing Sheets

(56) References Cited

U.S. PATENT DOCUMENTS

| | | | |
|---|---|---|---|
| 2004/0063454 A1* | 4/2004 | Sasaki | 455/522 |
| 2006/0041887 A1* | 2/2006 | Dusio | 718/100 |
| 2007/0112956 A1* | 5/2007 | Chapman et al. | 709/224 |
| 2007/0165624 A1 | 7/2007 | Saito et al. | |
| 2007/0281704 A1* | 12/2007 | Lin | H04W 68/12 455/445 |

* cited by examiner

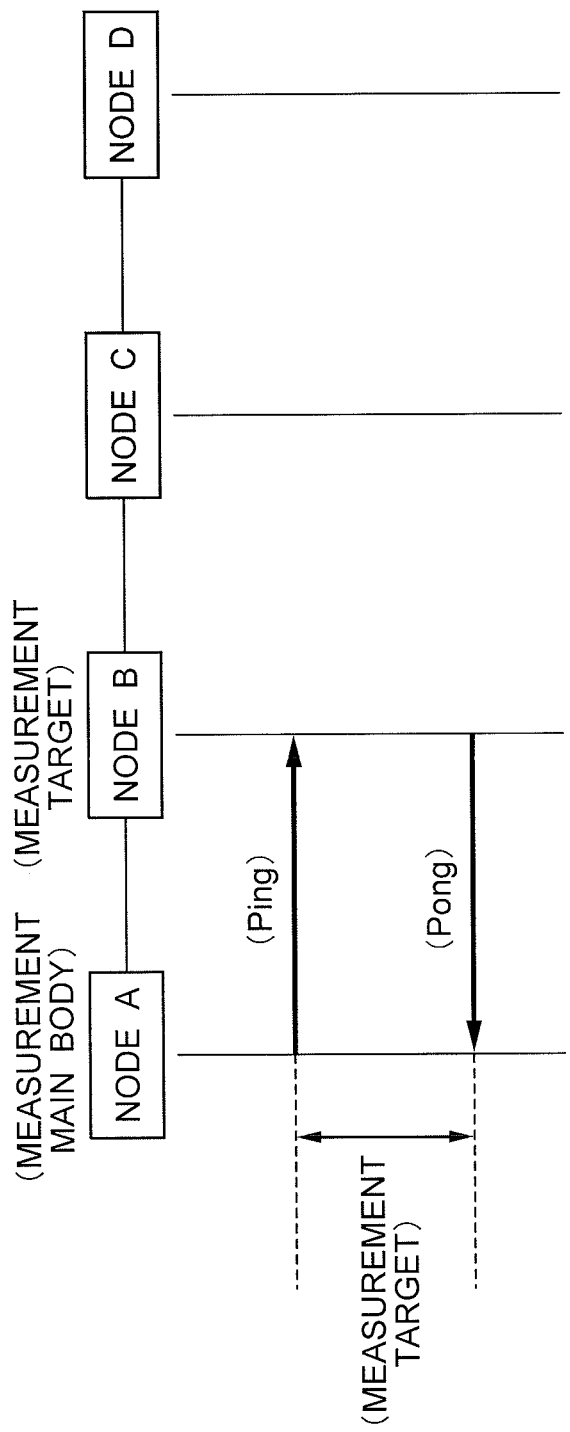

CALL PROCESSING TIME MEASURING DEVICE, CALL PROCESSING TIME MEASURING METHOD, AND CALL PROCESSING TIME MEASURING PROGRAM

CROSS REFERENCE TO RELATED APPLICATIONS

This application is a National Stage of International Application No. PCT/JP2008/071666 filed Nov. 28, 2008, claiming priority based on Japanese Patent Application No. 2007-310094, filed Nov. 30, 2007, the contents of all of which are incorporated herein by reference in their entirety.

TECHNICAL FIELD

The present invention relates to a processing time measuring device, a processing time measuring method, and a processing time measuring program for measuring processing time of call processing. More specifically, the present invention relates to a call processing time measuring device, a call processing time measuring method, and a call processing time measuring program, which can measure service time and cueing time of remote call processing systems.

BACKGROUND ART

FIG. 7 is a block diagram showing the structure of a processing time measuring device such as the one depicted in Non-Patent Document 1. The processing time measuring device shown in FIG. 7 is structured with a network interface (network I/F) 701, a Ping message transmitting section 702, a Ping message transmitted time recording section 703, a Pong message received time recording section 705, and a processing time computing section 704.

With the processing time measuring device shown in FIG. 7, the Ping message transmitting section 702 transmits a Ping message at an arbitrary time via the network I/F 701. The Ping message transmitted time recording section 703 records the transmitted time at which the Ping message is transmitted by the Ping message transmitting section 702. The Pong message received time recording section 705 records the received time of the Pong message received via the network I/F 701. The processing time computing section 704 compares the transmitted time of the Ping message with the received time of the Pong message, and takes the difference thereof as call processing time of an SIP server or the like that is a measurement target.

Note that a message transmitted from a measurement main body towards the measurement target is called a Ping message. A message returned from the measurement target when the Ping message arrives at the measurement target is called a Pong message. That is, the Ping message is a special message that is to be returned from the measurement target. Typically, the Ping message is structured by including an instruction to return a response for the message explicitly or structured to cause an error so that an error message is returned.

The measurement main body can detect the active/inactive state of the measurement target by receiving the Pong message. Further, the measurement main body judges the measurement time that is a difference between the transmitted time of the Ping message and the received time of the Pong message as the propagation time of the network and the processing time in the measurement target. Assuming that the propagation time of the network is so short that it can be ignored, the measurement time can be considered equal to the processing time in the measurement target. That is, the processing time of the measurement target can be measured by using the Ping message and the Pong message.

As shown in FIG. 8, the Ping message is transmitted to a neighboring node (e.g., a relay server such as an SIP server which communicates with the measurement main body in the network). In a case shown in FIG. 8, node A is the measurement main body, and node B neighboring to the node A is the measurement target. The node B that is the neighboring node performs reception processing of a message. In the reception processing, the node B reads out processing information from a header part of the message, and identifies whether or not to return the message. When judged that it is necessary to return the message, a message is returned as a Pong message. The Ping message can designate a return node. That is, it is also possible to designate the node to which the Pong message is to be transmitted in accordance with the Ping message.

Non-Patent Document 1 shows an example which implements Ping messages with ICMP (Internet Control Message Protocol) and Pong message with ICMP ECHO REPLY. With SIP, (Session Initiation Protocol), it is known to form Ping messages by properly setting transferable-number parameters called "MaxForwards". When "MaxForwards" reaches "0", transfer cannot be done any more. As a result, an error message is to be returned. This error message is used as a Pong message.

Non-Patent Document 1: W. Richard Stevens "TCP/IP Illustrated, Volume 1" Addison-Wesley Publishing Company, 1994, pp. 85-96

DISCLOSURE OF THE INVENTION

Problems to be Solved by the Invention

A first issue in the processing time measuring device is that it is not possible to measure the service time (time from the start of the processing to the end of the processing) spent actually for the processing of the message out of the processing time of messages. The reason is that the measured time is the entire processing time that is a total sum of the service time and cueing time that is the time between the arrival of the message and the start of call processing.

A second issue is that it is not possible to measure the cueing time out of the message processing time. The reason is that the measured time is the entire processing time that is a total sum of the service time and cueing time.

When call processing messages are congested on the network, it is possible to distinguish the problems by knowing whether the messages are congested because there are too many numbers of call processing or because extremely long time is being spent on only specific call processing. It is convenient when the proportion of the service time of the call processing and the cueing time until starting the processing time can be known in addition to that.

It is therefore an object of the present invention to provide a call processing time measuring device, a call processing time measuring method, and a call processing time measuring program, which can measure the service time spent actually for the processing of the message or the cueing time out of the message processing.

Means for Solving the Problems

In order to achieve the foregoing object, the call processing time measuring device according to the present invention is a call processing time measuring device which detects a state of a measurement-target node by transmitting a message towards the measurement-target node and receiving a response for the message, and the device is characterized to include: a measurement-target message detecting module which detects the message directed to the measurement-target node; a transmission instruction module which issues an instruction for transmitting the message to a transmission system leading to the measurement-target node, when the measurement-target message detecting module detects the message; a response request message transmitting module which transmits the message based on the transmission instruction issued by the transmission instruction module; and a distinguishing module which distinguishably detects a congestion state on the transmission system leading to the measurement-target node from the measurement main body node and a message processing state in the measurement-target node based on a response for the message from the measurement-target node or responses for the message from another node that transfers the message to the measurement-target node and the measurement-target node.

While the present invention is built as the call processing time measuring device as hardware, the present invention is not limited only to that. The present invention may also be built as a call processing time measuring method or a call processing time measuring program.

The call processing time measuring method according to the present invention is a call processing time measuring method which detects a state of a measurement-target node by transmitting a message towards the measurement-target node and receiving a response for the message, and the method is characterized to include: detecting the message directed to the measurement-target node; issuing an instruction for transmitting the message to a transmission system leading to the measurement-target node, upon detecting the message; transmitting the message based on the transmission instruction; and distinguishably detecting a congestion state on the transmission system leading to the measurement-target node from the measurement main body node and a message processing state in the measurement-target node based on a response for the message from the measurement-target node or responses for the message from another node that transfers the message to the measurement-target node and the measurement-target node.

The call processing time measuring program according to the present invention is a call processing time measuring program for executing controls to detect a state of a measurement-target node by retransmitting a message towards the measurement-target node and receiving a response for the message, and the program is characterized to cause a computer to execute: a function which detects the message directed to the measurement-target node; a function which issues an instruction for transmitting the message to a transmission system leading to the measurement-target node, upon detecting the message; a function which transmits the message based on the transmission instruction; and a function which distinguishably detects a congestion state on the transmission system leading to the measurement-target node from the measurement main body node and a message processing state in the measurement-target node based on a response for the message from the measurement-target node or responses for the message from another node that transfers the message to the measurement-target node and the measurement-target node.

Effects of the Invention

The present invention makes it possible to measure the service time (time that is actually required for the message processing) spent actually for the processing of the message out of the processing of messages. Further, another mode of the present invention makes it possible to measure the cueing time out of the message processing.

BEST MODES FOR CARRYING OUT THE INVENTION

Hereinafter, exemplary embodiments of the invention will be described in detail by referring to the drawings.

As shown in FIG. 1, FIG. 2, FIG. 3, and FIG. 5, the call processing time measuring device according to the exemplary embodiment of the invention is a call processing time measuring device which transmits a message to a measurement-target node, and detects the state of the measurement-target node by receiving a response to that message. The call processing time measuring device is characterized to include: a measurement-target message detecting module (3, 302, 502) which detects a message directed to the measurement-target node; a transmission instruction module (4, 51, 4, 52, 308, 307, 507, 508) which dispatches an instruction for transmitting the message to a transmission system leading to the measurement-target node; a response request message transmitting module (6, 303, 503) which transmits the message based on the transmission instruction issued by the transmission instruction module; and a distinguishing module (1, 21, 22, 304, 305, 306, 504, 505, 505) which distinguishably detects the congestion state on the transmission system leading from the node of the measurement main body to the measurement-target node and the state of the message processing on the measurement-target node based on a response for the message from the measurement-target node or responses for the message from another node that transfers the message to the measurement-target node and the measurement-target node.

The exemplary embodiment of the invention detects the message directed to the measurement-target node, issues an instruction for transmitting the message to the transmission system leading to the measurement target upon detecting the message, transmits the message based on the transmission instruction, and distinguishably detects the congestion state on the transmission system leading from the node of the measurement main body to the measurement-target node and the state of the message processing on the measurement-target node based on a response for the message from the measurement-target node or responses for the message from another node that transfers the message to the measurement-target node and the measurement-target node.

In the above explanation, it is described that the exemplary embodiment of the invention is built as the call processing time measuring device of hardware. However, the exemplary embodiment of the invention is not limited only to that. The exemplary embodiment of the invention may be built as a call processing time measuring program to be executed by a computer so as to execute functions of the measurement-target message detecting modules (3, 302, 502), the transmission instruction modules (4, 51, 4, 52, 308, 307, 507, 508), the response request message transmitting modules (6, 303, 503), and the distinguishing modules (1, 21, 22304, 305, 306, 504, 505, 505).

The call processing time measuring program according to the exemplary embodiment of the invention described above is a call processing time measuring program for executing controls to detect a state of the measurement-target node by transmitting a message towards the measurement-target node and receiving a response for the message. The program causes a computer to execute: a function which detects the message directed to the measurement-target node; a function which issues an instruction for transmitting the message to a transmission system leading to the measurement-target node, upon detecting the message; a function which transmits the message based on the transmission instruction; and a function which distinguishably detects an congested state on the transmission system leading to the measurement-target node from the measurement main body node and a message processing state in the measurement-target node based on a response for the message from the measurement-target node or responses for the message from another node that transfers the message to the measurement-target node and the measurement-target node.

Further, the call processing time measuring device according to the exemplary embodiment of the invention will be described in details by referring to a specific example. The exemplary embodiment of the invention shown in FIG. 1 is an example which uses a latest transmission instruction module 4 and an immediate transmission instruction module 51 as the transmission instruction modules, and uses a response message received time recording module 1 and a processing time computing module 21 as the distinguishing modules.

With the call processing time measuring device shown in FIG. 1, when the measurement-target message detecting module 3 detects a measurement-target message used for measuring the time required for executing the processing of the message of the measurement-target node, the latest transmission instruction module 4 requests the response request message transmitting module 6 to transmit a response request message right before the measurement-target message towards the measurement-target node. Further, when the measurement-target message detecting module 3 detects the measurement-target message, the immediate transmission instruction module 51 requests the response request message transmitting module 6 to transmit a response request message right after the measurement-target message towards the measurement-target node. In response to the respective transmission requests, the response request message transmitting module 6 transmits the response request messages that are the messages requesting the response. Further, the response message reception recording module 1 records the received time of each of the response messages from the measurement-target node. Furthermore, the processing time computing module 21 computes a difference between the times at which the respective response messages are received recorded in the response message received time recording module 1 to measure the time required for executing the message processing in the measurement-target node.

The call processing time measuring device shown in FIG. 1 transmits the response request messages, respectively, right before and right after transmitting that measurement-target message when transmitting the measurement-target message used for measuring the time required for executing the message processing in the measurement-target node to the measurement-target node, and the processing time computing module 21 measures the time required for the message processing time in the measurement-target node based on the times at which the response messages as the responses for the requests are received. Thus, based on the responses for the messages from the measurement-target node, the congestion state on the transmission system leading to the measurement-target node and the state of the message processing on the measurement-target node are distinguishably detected.

That is, in the case of FIG. 1, the response request messages are transmitted, respectively, right before and right after transmitting the measurement-target message, and the state of the measurement-target node is detected by receiving the response messages as the responses for those. Thus, the congestion state on the transmission system leading to the measurement-target node can be detected by monitoring the time at which the response message for the response request message sent right before transmitting the measurement-target message is received. Further, the state of the message processing on the measurement-target node can be detected by monitoring the time difference between the times at which the response messages for the response request messages sent right before and right after transmitting the measurement-target message are received. Thereby, the congestion state and the message processing state can be distinguishably detected.

The exemplary embodiment of the invention shown in FIG. 2 is an example which uses the latest transmission instruction module 4 and a prior transmission instruction module 52 as the transmission instruction modules, and uses the response message received time recording module 1 and a processing time computing module 22 as the distinguishing modules.

With the call processing time measuring device shown in FIG. 2, when the measurement-target message detecting module 3 detects a measurement-target message used for measuring the cueing time that is from the reception of the measurement-target message of the measurement-target node to the start of the processing, the latest transmission instruction module 4 requests the response request message transmitting module 6 to transmit a response request message right before the measurement-target message towards the measurement-target node. Further, when the measurement-target message detecting module 3 detects the measurement-target message, the prior transmission instruction module 52 requests the response request message transmitting module 6 to transmit a response request message towards a node that is before the measurement-target node. In response to the respective transmission requests, the response request message transmitting module 6 transmits the response request messages that are the messages requesting the response. The response message reception recording module 1 records the received time of each response message from the measurement-target node and the prior node. Furthermore, the processing time computing module 22 computes the difference between the times at which the respective response messages are received recorded in the response message received time recording module 1 to measure the cueing time required in the measurement-target node.

The call processing time measuring device shown in FIG. 2 transmits the response request message right before transmitting that measurement-target message towards the measurement-target node while transmitting the response request message towards the prior node of the measurement-target node to which the message is transferred, and transmits the response request messages, respectively, right before and right after transmitting the measurement-target message when transmitting the measurement-target message used for measuring the time required for executing the message processing in the measurement-target node to the measurement-target node, and the processing time computing module 21 measures the time required for the message processing time in the measurement-target node based on the times at which the response messages as the responses for the requests are received. Thus, based on the responses for the messages from the measurement-target node and the prior node, the congestion state on the transmission system leading to the measurement-target node and the state of the message processing on the measurement-target node are distinguishably detected.

That is, in the case of FIG. 2, the congestion state on the transmission system leading to the measurement-target node can be detected based on the time difference between the time at which the response message transmitted from the prior node is received and the time at which the response message transmitted from the measurement-target node is received. Further, the state of the message processing on the measurement-target node can be detected by monitoring the time difference between the times at which the response messages for the response request messages sent right before and right after transmitting the measurement-target message are received. Thereby, the congestion state and the message processing state can be distinguishably detected.

The call processing time measuring devices shown in FIG. 1 and FIG. 2 are built-in to an SIP server, for example. Further, the devices may be built-in to a measuring device placed outside the SIP server.

Furthermore, the structures of the call processing time measuring devices shown in FIG. 1 and FIG. 2 can be achieved as a program executed by a CPU of the SIP server and the measuring device, for example.

First Exemplary Embodiment

Further, an embodied example of the call processing time measuring device shown in FIG. 1 will be described as the first exemplary embodiment by referring to FIG. 3. The call processing time measuring device shown in FIG. 3 includes an immediate transmission instruction section 307 and a latest transmission instruction section 308 in addition to a network I/F 301, a measurement-target message detecting section 302, a Ping message transmitting section 303, a Ping message transmitted time recording section 304, a Pong message received time recording section 305, and a processing time computing section 306.

The network I/F 301, the measurement-target message detecting section 302, the Ping message transmitting section 303, the Ping message transmitted time recording section 304, the Pong message received time recording section 305, and the processing time computing section 306 execute the functions that are equivalent to the functions of the network I/F 701, the Ping message transmitting section 702, the Ping message transmitted time recording section 703, the Pong message received time recording section 705, and the processing time computing section 704.

However, the computation-processing targets of the processing time computing section 306 are two pieces of Pong message received times in this embodiment.

The network I/F 301 is an NIC (Network Interface Card), for example, and controls the lower layers of transmission and reception of messages to/from the network. When the network I/F 301 detects a message (measurement-target message) as a measurement target, the measurement-target message detecting section 302 informs so to the latest transmission instruction section 308 and the immediate transmission instruction section 307. When informed that the measurement-target message is detected, the latest transmission instruction section 308 and the immediate transmission instruction section 307 request the Ping message transmitting section 303 to transmit a Ping message. In other words, the latest transmission instruction section 308 and the immediate transmission instruction section 307 give instructions to execute transmission. The Ping message transmitting section 303 generates the Ping message, and transmits it via the network I/F 301.

The Ping message transmitted time recording section 304 records the transmitted time of the Ping message transmitted from the Ping message transmitting section 303. When there is a possibility of having a plurality of transmitted Ping messages whose corresponding Pong messages are not received, the Ping message transmitted time recording section 304 records the discriminating information of the Ping messages along with the transmitted times of the Ping messages. The Pong message received time recording section 305 records the received times of the Pong messages. The processing time computing section 306 calculates the time difference between the two pieces of Pong message received times recorded in the Pong message received time recording section 305.

The latest transmission instruction section 308 gives an instruction to the Ping message transmitting section 303 to transmit the Ping message right before the measurement-target message. The immediate transmission instruction section 307 gives an instruction to the Ping message transmitting section 303 to transmit the Ping message right after the measurement-target message. To transmit the Ping message right before the measurement-target message means to transmit the Ping message when the measurement-target message is ready to be transmitted, and to transmit the measurement-target message successively. Further, to transmit the Ping message right after the measurement-target message means to transmit the Ping message successively after transmitting the measurement-target message.

Next, the overall actions of the exemplary embodiment will be described by referring to a block diagram of FIG. 3 and a message flowchart of FIG. 4. In an example shown in FIG. 4, node C is taken as the measurement-target node.

The structure shown in FIG. 3 is provided to the node A that is the measurement main body shown in FIG. 4. When a measurement-target message arrives at the node A and the measurement-target message detecting section 302 detects the measurement-target message, it is informed to the latest transmission instruction section 308 and the immediate transmission instruction section 307 that the measurement-target message is detected. The latest transmission instruction section 308 requests the Ping message transmitting section 303 to transmit a Ping message right before the measurement-target message. Further, the immediate transmission instruction section 307 requests to transmit a Ping message right after the measurement-target message. In response to each of the requests, the Ping message transmitting section 303 transmits a first message to the node B right before the measurement-target message and transmits a second Ping message right after the measurement-target message (see S11 in FIG. 4).

The node B that is not the measurement-target node transfers the first Ping message, the measurement-target message, and the second Ping message to the node C (see FIG. 12 in FIG. 4). Then, the node C that is the measurement-target node receives the first Ping message, the measurement-target message, and the second Ping message.

The received messages are processed in order, so that it takes time until starting the processing of the measurement-target message, and the like (S15 in FIG. 15: see cueing time). During that time, the received first Ping message, measurement-target message, and second Ping message are temporarily stored in a buffer memory (referred to as a buffer hereinafter) of the measurement-target node (node C). The node C processes the first Ping message after processing all the messages received before. As a result, the node C returns a first Pong message (see S16 in FIG. 4). The first Pong message is transmitted to the node A that is the measurement main body (see S17 in FIG. 14). The Pong message received time recording section 305 in the node A records the received time of the received first Pong message.

After returning the first Pong message, the node C as the measurement-target node performs processing of the measurement-target message (S18 in FIG. 4: see service time). When completing the processing of the measurement-target message, processing of the second Ping message is performed. As a result, the node C returns a second Pong message (see S19 in FIG. 4). The second Pong message is transmitted to the node A that is the measurement main body (see S20 in FIG. 4).

When the second Pong message arrives at the node A that is the measurement main body, the Pong message received time recording section 305 in the node A records the received time. The processing time computing section 306 computes a difference between the arrival times of the two Pong messages. As described hereinafter, the processing time computing section 306 measures the service time (time from a point at which the message is taken out from the buffer to a point at which the processing of the message is completed) of the measurement-target message in the measurement-target node (node C) by computing the difference between the arrival times of the two Pong messages (t12'−t11' in FIG. 4).

Next, effects of the exemplary embodiment will be described. If the difference between the time (t11 in FIG. 4) at which the measurement-target node (node C) starts the processing of the measurement-target message and the time (t11' in FIG. 4) at which the node A as the measurement main body receives the first Pong message is so small that it can be ignored and the difference between the time (t12 in FIG. 4) at which the measurement-target node ends the processing of the measurement-target message and the time (t12' in FIG. 4) at which the node A as the measurement main body receives the second Pong message is so small that it can be ignored, the service time (t12'−t11') computed by the processing time computing section 306 is considered almost equivalent to the actual service time (t12−t11). In FIG. 4, (t12−t11) is shown as a measurement target Q that is the idealistic measurement-target time. Further, (t12'−t11') is shown as a measurement target P that is the actual measurement-target time of this exemplary embodiment.

The difference between t11 and t11' is mainly caused by the propagation time of the network and delay in the node on the way. However, in many cases, the difference is so small that it can be ignored when there is no significant delay except in the measurement target. Similarly, the difference between t12' and t12' is so small that it can be ignored in many cases. Thus, it can be considered that measured by the processing time computing section 306 is the service time of the measurement-target node.

For example, in a case where an administrator of the system or the like judges that the processing of the node C is late, the administrator designates the node C as the measurement target. As a way of example, in a case where the processing for INVITE message in the node C is judged as late, the INVITE message is taken as the measurement-target message, and the measurement-target message detecting section 302 in the measurement main body may inform the latest transmission instruction section 308 and the immediate transmission instruction section 307 that the measurement-target message is detected, upon detecting the INVITE message. Further, the fact that the measurement target is the node C is set in the Ping message transmitting section 303 by the administrator or the like. Then, in that state, the Ping message transmitting section 303 transmits a Ping message to set the node to which a Pong message is to be transmitted as the node C, upon receiving requests for transmitting the Ping message from the latest transmission instruction section 308 and the immediate transmission instruction section 307.

As described above, it is possible with the exemplary embodiment to measure the service time spent actually on the processing of the message out of the processing of the messages. The reason is that the exemplary embodiment can measure the service time of the measurement-target message in the measurement-target node through: transmitting the Ping message right before and right after the measurement-target message; taking the received time of the Pong message corresponding to the first Ping message as the time at which the processing of the measurement-target message is started in the measurement-target node; taking the received time of the Pong message corresponding to the second Ping message as the time at which the processing of the measurement-target message is completed in the measurement-target node; and computing the time difference between the two times.

Desired effects can be obtained by the above-described operations both in a case where the measurement main body generates the measurement-target message and in a case where the measurement main body does not generate the measurement-target message but detects the measurement-target message transmitted by other devices. Further, as a way of example, a Ping message using MaxForwards parameter of SIP can be used as the Ping message that is set to be returned by the measurement-target node. As another example, TTL (Time To Live) of IP (Internet Protocol) can be used.

As an example where the measurement main body generates the measurement-target message, there is considered a case where the Ping message transmitting section 303 generates the Ping message by copying the measurement-target message and having the information for designating the node to which the Pong message is returned included in the copied measurement-target message. In that case, the Ping message transmitting section 603 and the Ping message transmitting section 303 may change the copied measurement-target message to a message whose processing load imposed due to the reception of the measurement-target message is smaller than the processing load imposed due to the received message (processing amount or the like imposed due to the message in the node that has received the message).

Further, as a method for transmitting the Ping message right before, there is considered a method which transmits the measurement-target message after transmitting the Ping message right before by storing the measurement-target message in the buffer and temporarily delaying transmission of the measurement-target message. Furthermore, as another method for transmitting the Ping message right before, there is considered a method which has the Ping message interrupted into the buffer of the network I/F 301 to transmit the Ping message first. As still another method for transmitting the Ping message right before, there is considered a method which prepares transmission buffers with different priority degrees, stores the measurement-target message to the buffer of the lower priority degree, stores the Ping message to be transmitted right before to the buffer of the higher priority order, and preferentially transmits the Ping message to be transmitted right before.

In the exemplary embodiment, the processing time computing section 306 computes the difference between the arrival times of the two Pong messages. That is, the transmitted time of the Ping message is not used. Thus, it is not necessary to provide the Ping message transmitted time recording section 304.

Second Exemplary Embodiment

Further, an embodied example of the call processing time measuring device shown in FIG. 2 will be described as the second exemplary embodiment by referring to FIG. 5. The call processing time measuring device shown in FIG. 5 includes a network I/F 501, a measurement-target message detecting section 502, a Ping message transmitting section 503, a Ping message transmitted time recording section 504, a Pong message received time recording section 505, a processing time computing section 506, an immediate transmission instruction section 507, and a prior transmission instruction section 508. The network I/F 501, the measurement-target message detecting section 502, the Ping message transmitting section 503, the Ping message transmitted time recording section 504, the Pong message received time recording section 505, and the processing time computing section 506 execute the functions that are equivalent to the functions of the network I/F 301, the measurement-target message detecting section 302, the Ping message transmitting section 303, the Ping message transmitted time recording section 304, the Pong message received time recording section 305, and the processing time computing section 306.

Upon detecting a message as a measurement target, the measurement-target message detecting section 502 informs so to the latest transmission instruction section 508 and the prior transmission instruction section 507. When informed that the measurement-target message is detected, the latest transmission instruction section 508 and the prior transmission instruction section 507 request the Ping message transmitting section 503 to transmit a Ping message. The Ping message transmitting section 503 generates the Ping messages according to the requests from the latest transmission instruction section 508 and the prior transmission instruction section 507, and transmits those via the network I/F 501.

The Ping message transmitted time recording section 504 records the transmitted times of the Ping messages transmitted from the Ping message transmitting section 503. When there is a possibility of having a plurality of transmitted Ping messages whose corresponding Pong messages are not received, the Ping message transmitted time recording section 504 records the discriminating information of the Ping messages along with the transmitted times of the Ping messages. The Pong message received time recording section 505 records the received times of the Pong messages. The processing time computing section 506 computes the time difference between the two pieces of Pong message received times recorded in the Pong message received time recording section 505.

The latest transmission instruction section 507 gives an instruction to the Ping message transmitting section 503 to transmit the Ping message that is set to be returned at the measurement-target node right before the measurement-target message. The prior transmission instruction section 508 gives an instruction to the Ping message transmitting section 503 to transmit the Ping message that is set to be returned at the node that is before the measurement target right before the measurement-target message. The node located prior to the measurement target is a node such as a server positioned between the measurement-target node and the measurement main body node in the network, and it is a node directly communicating with the measurement-target node.

Next, the overall actions of the exemplary embodiment will be described by referring to a block diagram of FIG. 5 and a message flowchart of FIG. 6. In an example shown in FIG. 6, node C is taken as the measurement-target node.

The structure shown in FIG. 5 is provided to the node A that is the measurement main body shown in FIG. 6. When the measurement-target message detecting section 502 detects the measurement-target message, it is informed to the latest transmission instruction section 508 and the prior transmission instruction section 507 that the measurement-target message is detected. The latest transmission instruction section 507 requests the Ping message transmitting section 503 to transmit a Ping message right before the measurement-target message. Further, the prior transmission instruction section 508 also requests to transmit a Ping message right before the measurement-target message.

The Ping message transmitting section 503 transmits a first Ping message to the node B right before the measurement-target message in response to the request from the latest transmission instruction section 507, and successively transmits a second Ping message in response to the request from the prior transmission instruction section 508 (see S21 in FIG. 6). The first Ping message is a Ping message that is set to be retuned at the measurement-target node (the node C in the case shown in FIG. 6), and the second Ping message is a Ping message that is set to be retuned at the prior node of the measurement target (the node B in the case shown in FIG. 6).

The node B that is one before the measurement-target node transfers the first Ping message and the measurement-target message to the node C (see S22 in FIG. 6). Further, the node B returns the second Ping message. That is, the node B returns a first Pong message to the node A (see S23 in FIG. 6). The Pong message received time recording section 505 in the node A records the received time of the received first Pong message.

The node C as the measurement-target node receives the first Ping message and the measurement-target message from the node B. The received messages are processed in order, so that it takes time until the processing of the measurement-target message is started (see S25 in FIG. 6). The node C processes the first Ping message after completing the processing on all the messages received before. As a result, the node C returns the second Pong message (see S26 in FIG. 6).

The second Pong message is transmitted to the node A that is the measurement main body (see S27 in FIG. 6). In the node A, the Pong message received time recording section 505 records the received time of the received second Pong message.

The processing time computing section 506 computes a difference between the arrival times of the two Pong messages. As described hereinafter, the processing time computing section 506 is to measure the cueing time (time from a point at which the message is stored in the buffer to a point at which the message is taken out from the buffer for starting the processing of the message) of the measurement-target message in the measurement-target node (t22'−t21' in FIG. 6). Further, the measurement-target node C performs the processing of the measurement-target message (see S28 in FIG. 6).

Next, effects of the exemplary embodiment will be described. The difference between the time (t21 in FIG. 6) at which the measurement-target node (the node C in this case) starts cueing of the measurement-target message and the time (t21' in FIG. 6) at which the node A as the measurement main body receives the first Pong message is generated by the propagation time of the network and delay in the node on the way. However, the difference in many cases is sufficiently small especially under conditions where there is no significant bottleneck or the like except in the measurement-target node. Similarly, the time (t22 in FIG. 6) at which the measurement-target node ends the cueing of the measurement-target message and the time (t22' in FIG. 6) at which the node A receives the Pong message are almost the same in many cases.

As can bee seen from the illustration of FIG. 6, if the difference between the time (t21 in FIG. 6) at which the measurement-target node starts cueing of the measurement-target message and the time (t21' in FIG. 6) at which the node A receives the first Pong message is so small that it can be ignored and the difference between the time (t22 in FIG. 6) at which the measurement-target node ends the cueing of the measurement-target message and the time (t22' in FIG. 6) at which the node A receives the second Pong message is so small that it can be ignored, the cueing time (t22'−t21') computed by the processing time computing section 506 is considered almost equivalent to the actual service time (t22−t21). Thus, it is considered that the processing time computing section 506 computes the cueing time.

As described above, it is possible with the exemplary embodiment to measure the cueing time out of the processing of the messages. The reason is that the exemplary embodiment can measure the cueing time of the measurement-target message in the measurement-target node through: transmitting the Ping message that is returned at the node prior to the measurement-target node and the Ping message that is returned at the measurement-target node right before the measurement-target message; taking the received time of the Pong message corresponding to the first Ping message as the time at which the measurement-target message may be arrived at the measurement-target node; taking the received time of the Pong message corresponding to the second Ping message as the time at which the processing of the measurement-target message is started in the measurement-target node; and computing the time difference between the two times.

Desired effects can be obtained by the above-described operations both in a case where the measurement main body generates the measurement-target message and in a case where the measurement main body does not generate the measurement-target message but detects the measurement-target message transmitted by other devices. Further, as a way of example, a Ping message using MaxForwards parameter of SIP can be used as the Ping message that is set to be returned by the measurement-target node. As another example, TTL of IP can be used.

In the exemplary embodiment, the processing time computing section 506 computes the difference between the arrival times of the two Pong messages. That is, the transmitted time of the Ping message is not used. Thus, it is not necessary to provide the Ping message transmitted time recording section 504. However, in a case where the Ping message transmitted time recording section 504 is provided, it is also possible to measure the entire message processing time in the measurement-target node as shown in FIG. 8.

Further, for making it simpler, it is illustrated in FIG. 6 that the prior transmission instruction section 508 gives an instruction to the Ping message transmitting section 503 to transmit the Ping message that is set to be returned at the node located prior to the measurement-target node right before the measurement-target message. However, the same effects can be also achieved by transmitting such Ping message right after the measurement-target message.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

This application claims the Priority right based on Japanese Patent Application No. 2007-310094 filed on Nov. 30, 2007 and the disclosure thereof is hereby incorporated by reference in its entirety.

INDUSTRIAL APPLICABILITY

The present invention can be applied for being built-in to an SIP server and the like, which makes it possible to specify a server that cannot perform sound call processing, and provide information for avoiding that server. Further, the present invention can be implemented as a measurement device so as to identify the SIP server or the like which causes congestion when there is an occurrence of failure.

BRIEF DESCRIPTION OF THE DRAWINGS

FIG. 8 is a message flowchart showing actions of the call processing time measuring device shown in FIG. 7.

REFERENCE NUMERALS

Figure 1:
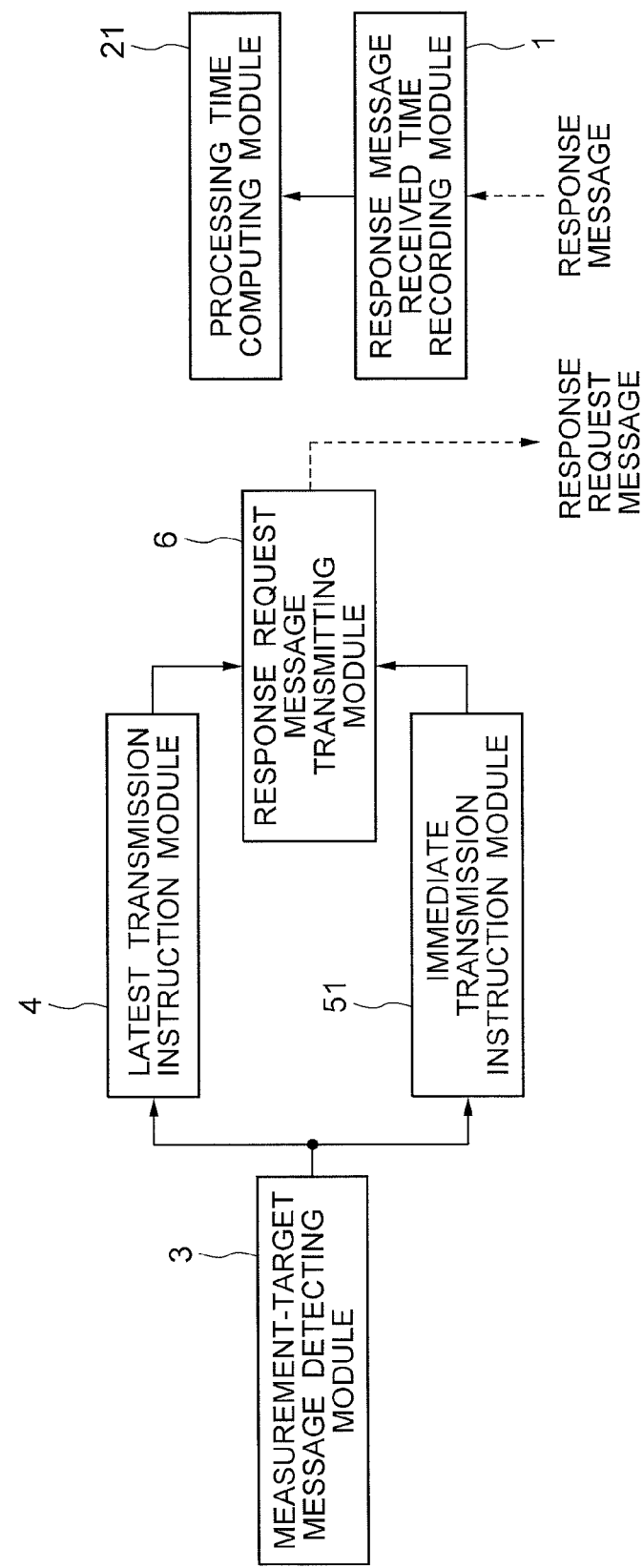
FIG. 1 is a block diagram showing the structure of a call processing time measuring device according to an exemplary embodiment of the invention.
Figure 2:
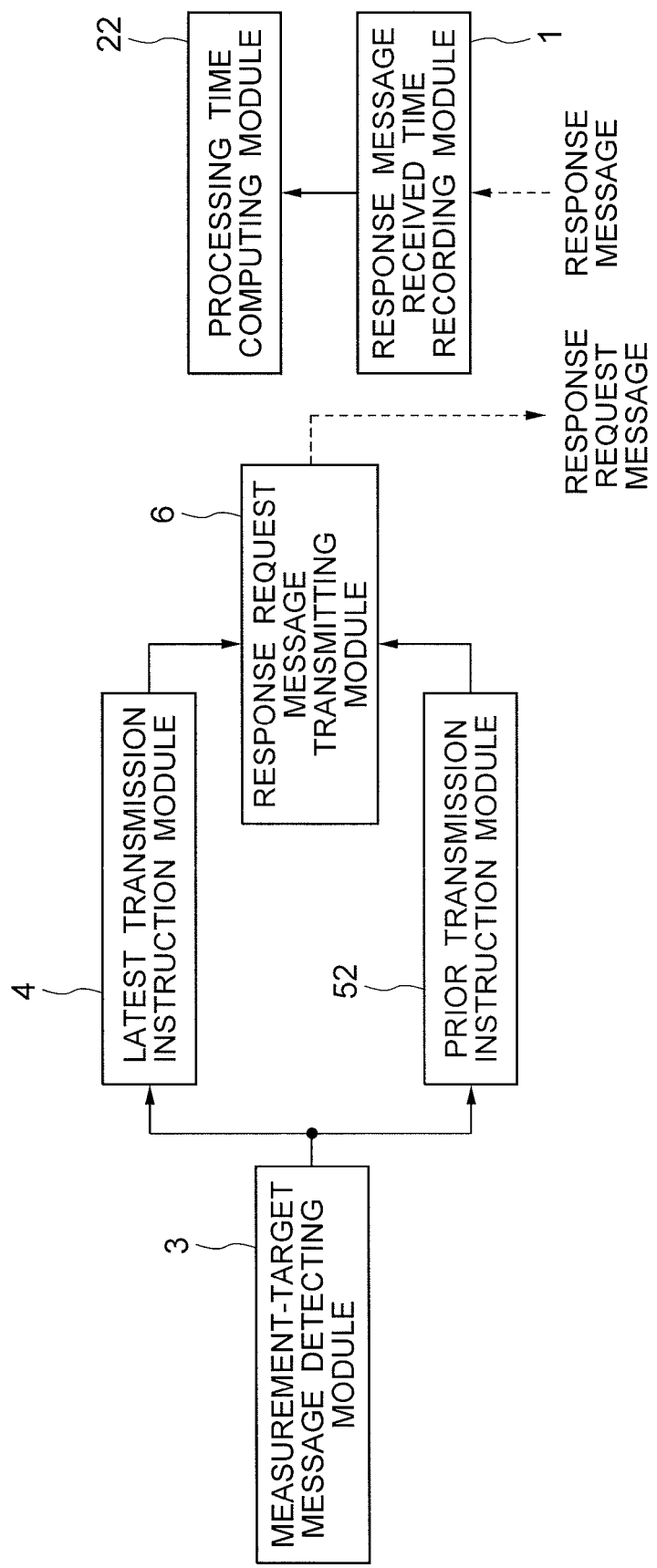
FIG. 2 is a block diagram showing the structure of a call processing time measuring device according to another exemplary embodiment of the invention.
Figure 3:
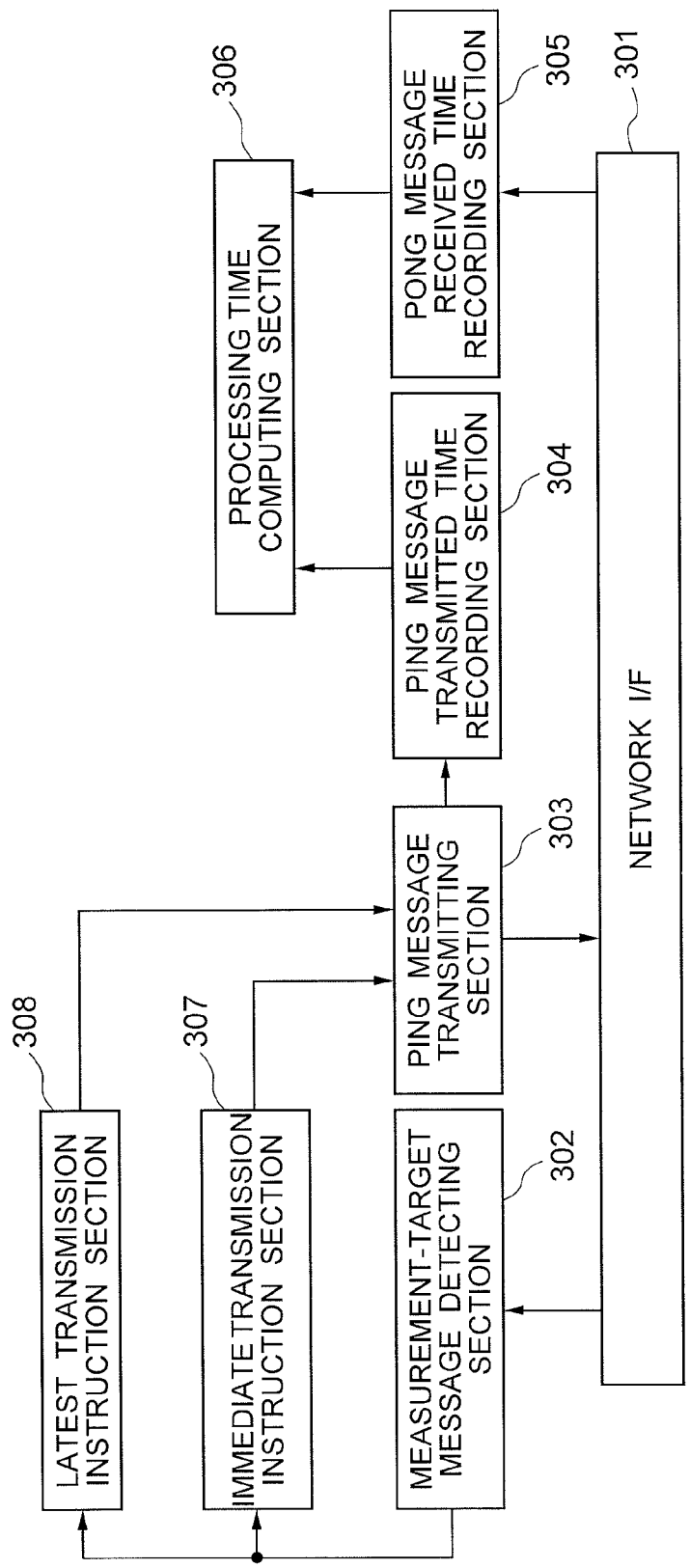
FIG. 3 is a block diagram showing the structure of a call processing time measuring device in a call processing time measuring system according to a first exemplary embodiment of the invention.
Figure 4:
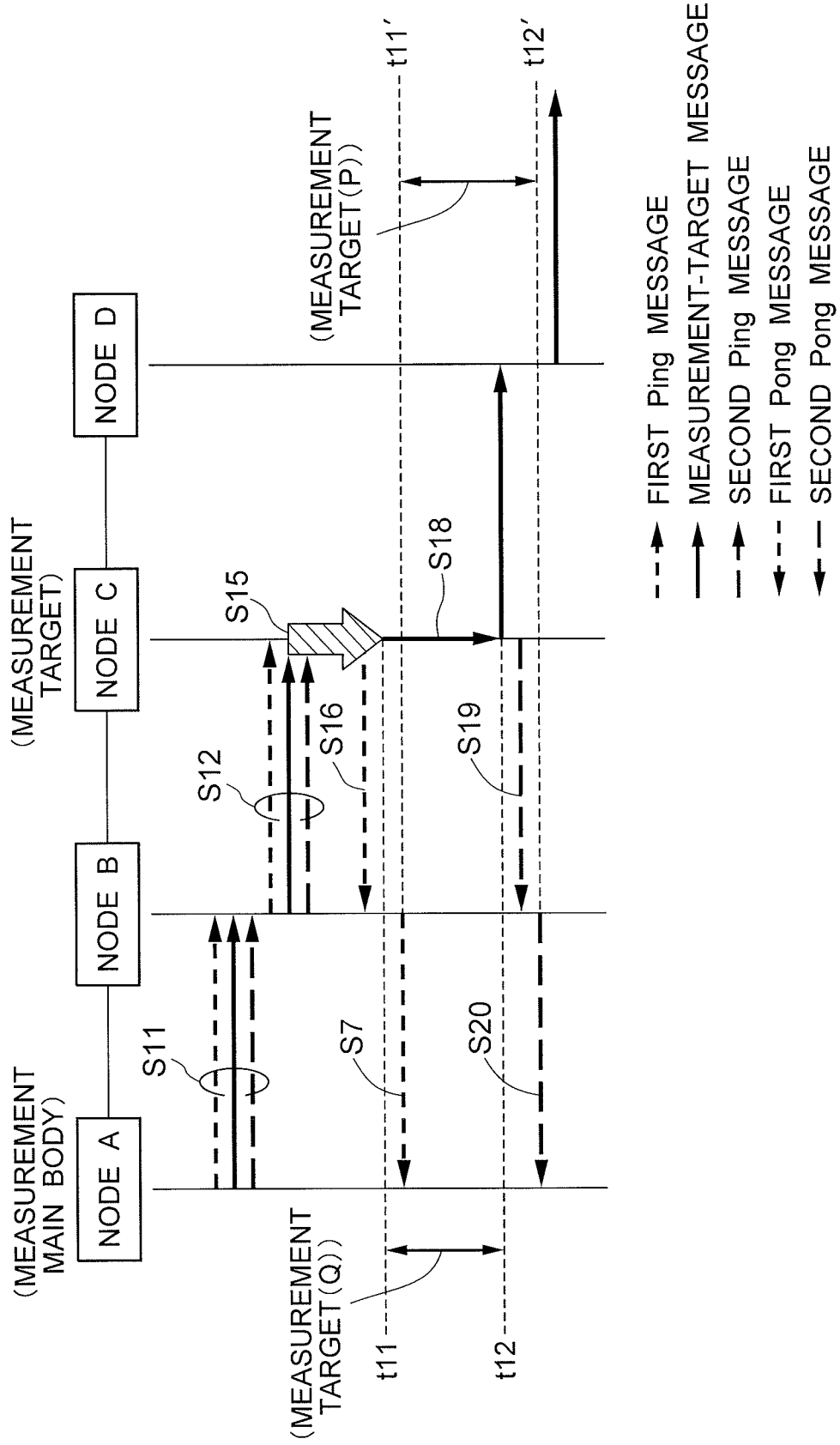
FIG. 4 is a message flowchart showing actions of the first exemplary embodiment.
Figure 5:
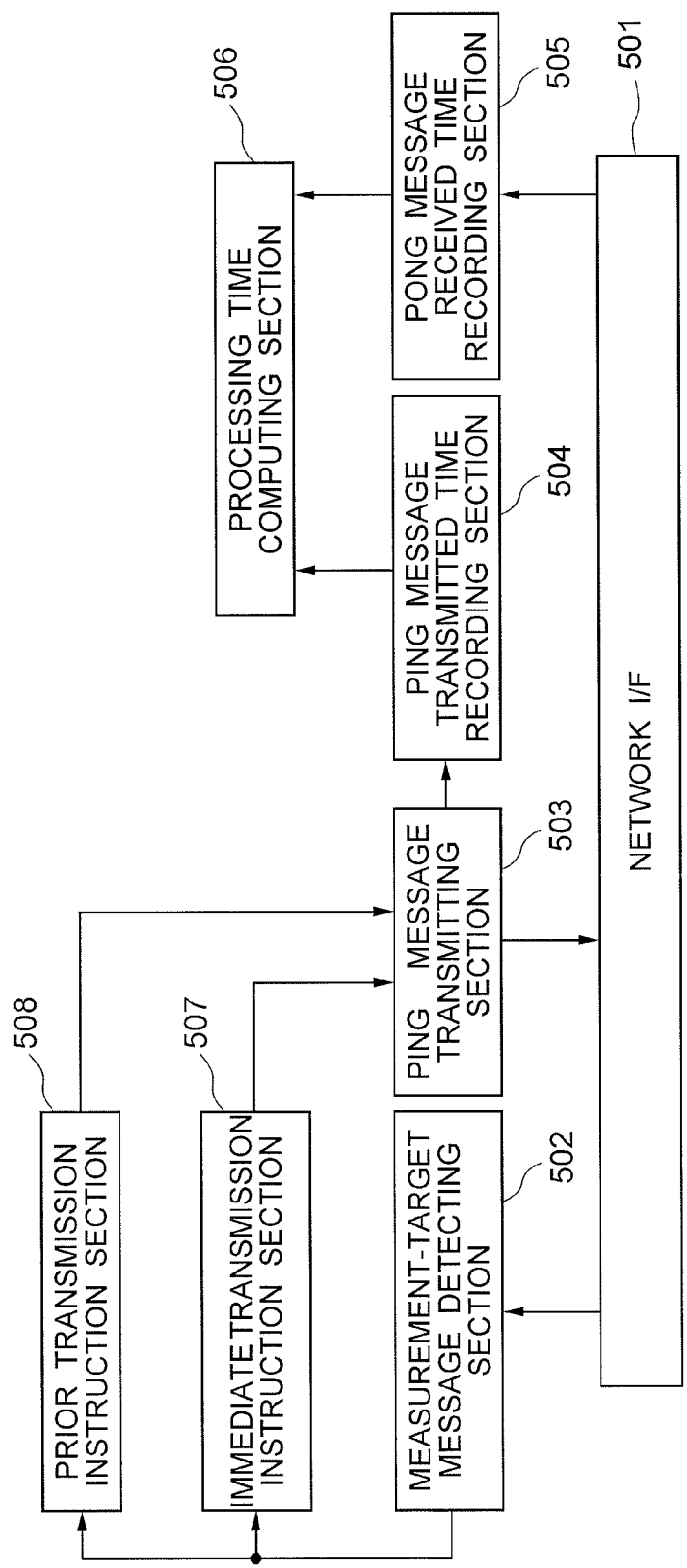
FIG. 5 is a block diagram showing the structure of a call processing time measuring device in a call processing time measuring system according to a second exemplary embodiment of the invention.
Figure 6:
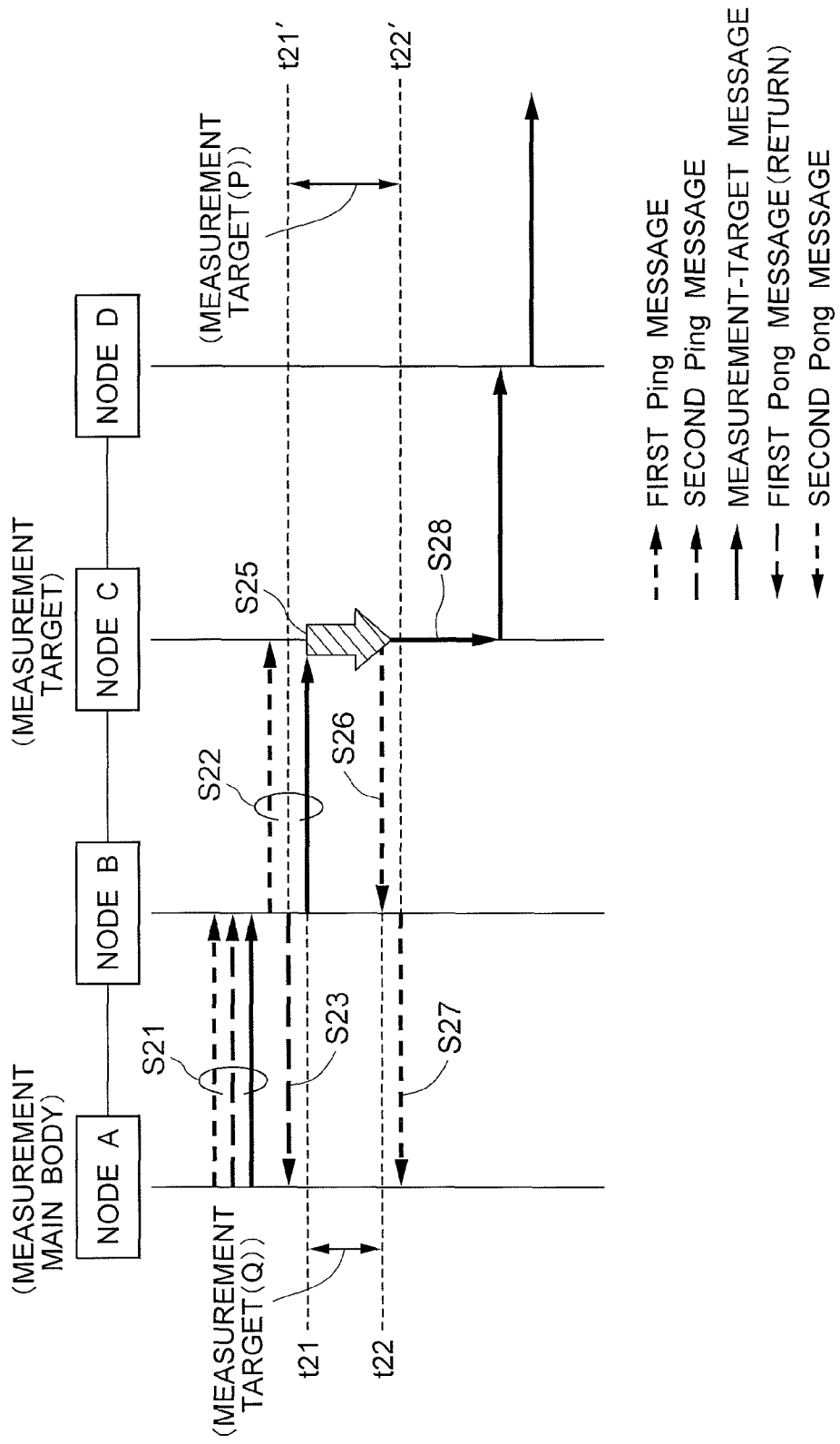
FIG. 6 is a message flowchart showing actions of the second exemplary embodiment.
Figure 7:
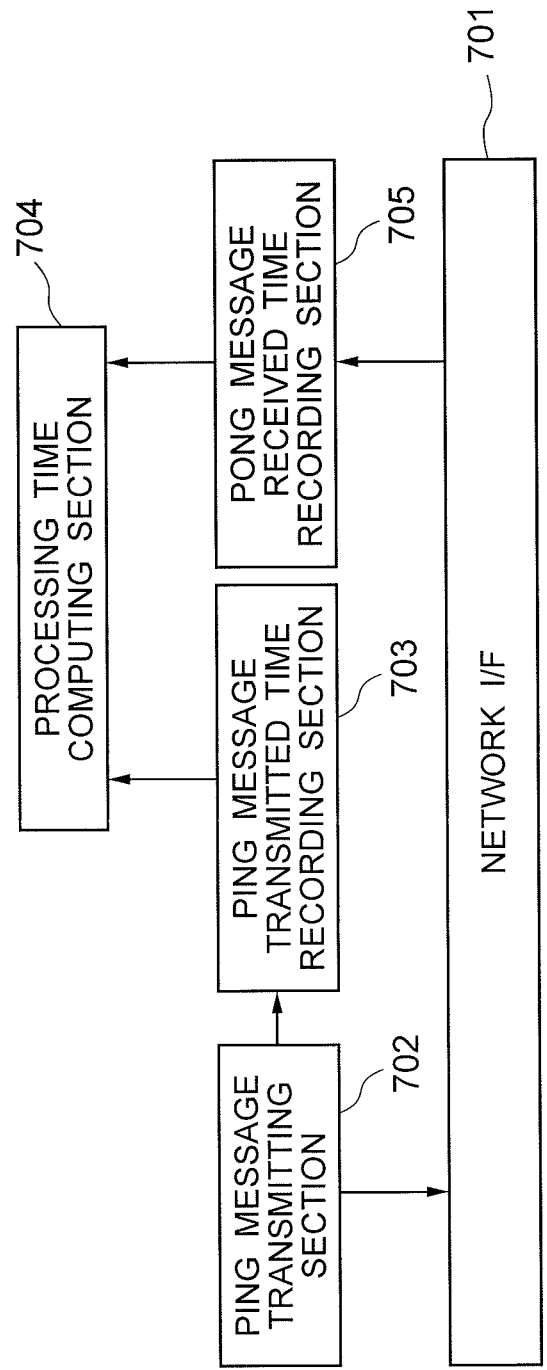
FIG. 7 is a block diagram showing the structure of a call processing time measuring device of a related technique.

301 Network I/F
302 Measurement-target message detecting section
303 Ping message transmitting section
304 Ping message transmitted time recording section
305 Pong message received time recording section
306 Processing time computing section
307 Immediate transmission instruction section
308 Latest transmission instruction section
501 Network I/F
502 Measurement-target message detecting section
503 Ping message transmitting section
504 Ping message transmitted time recording section
505 Pong message received time recording section
506 Processing time computing section
507 Latest transmission instruction section
508 Prior transmission instruction section
701 Network I/F
702 Ping message transmitting section
703 Ping message transmitted time recording section
704 Processing time computing section
705 Pong message received time recording section

The invention claimed is:

1. A call processing time measuring device which detects a state of a measurement-target node by transmitting a message from a measurement main body towards a plurality of measurement-target nodes linked through a transmitting system and receiving a response for the message, the device comprising:

a measurement-target message detector which is implemented as hardware and which detects a measurement-target message from the measurement main body used for measuring time required to process the message in the measurement-target node;

a transmitter which is implemented as hardware and which transmits the measurement-target message including a response request message towards the measurement-target node right before and right after the measurement-target message, when the measurement-target message detector detects the measurement-target message;

a response message received time recorder which is implemented as hardware and which records received time of each response message responded to each of the response request messages transmitted by the measurement-target node or other measurement-target node to which the measurement-target message is transferred via a node that is not the measurement-target node and discriminating information of the measurement-target message; and a processing time measurer which is implemented as hardware and which measures the time required to process the message in the measurement-target node to detect a congestion state on the transmission system leading to the measurement-target node from the measurement main body through detecting a difference between the received times of each of the response messages recorded in the response message received time recorder.

2. A call processing time measuring device which detects a state of a measurement-target node by transmitting a message from a measurement main body towards a plurality of measurement-target nodes linked through a transmitting system and receiving a response for the message, the device comprising:

a measurement-target message detector which is implemented as hardware and which detects a measurement-target message from the measurement main body used for measuring cueing time that is from reception of the measurement-target message to start of the processing in the measurement-target node;

a transmitter which is implemented as hardware and which transmits a response request message right before the measurement-target message and transmit a response request message to a prior node which transfers the measurement-target message to the measurement-target node, when the measurement-target message detector detects the measurement-target message;

a response message receiving time recorder which is implemented as hardware and which records received time of each response message responded to each of the response request message transmitted by the measurement-target node and the prior node; and a processing time measurer which is implemented as hardware and which measures the cueing time in the measurement-target node to detect a congestion state on the transmission system leading to the measurement-target node from the measurement main body via the prior node through computing a difference between the received times of each of the response messages recorded in the response message receiving time recorder.

3. A call processing time measuring method which detects a state of a measurement-target node by transmitting a message from a measurement main body towards a plurality of measurement-target nodes linked through a transmitting system and receiving a response for the message, the method comprising:

detecting, as the message, a measurement-target message used for measuring time required to process the message in the measurement-target node;

transmitting the measurement-target message including a response request message right before and right after the measurement-target message to the measurement-target node, or, to the measurement-target node via a node that is not the measurement-target node, upon detecting the measurement-target message;

recording received time of each response message responded to each of the response request messages transmitted by the measurement-target node to which the measurement-target message is transferred and discriminating information of the measurement-target message; and measuring the time required to process the message in the measurement-target node to detect a congestion state on the transmission system leading to the measurement-target node from the measurement main body through detecting a difference between the recorded received times of each of the response messages.

4. A call processing time measuring method which detects a state of a measurement-target node by transmitting a message from a measurement main body towards a plurality of measurement-target nodes linked through a transmitting system and receiving a response for the message, the method comprising:

detecting a measurement-target message from the measurement main body used for measuring cueing time that is from reception of the measurement-target message to start of the processing in the measurement-target node;

transmitting a response request message right before the measurement-target message and transmitting a response request message to a prior node which transfers the message to the measurement-target node, upon detecting the measurement-target message;

recording received time of each response message responded to each of the response request messages transmitted by the measurement-target node and the prior node; and measuring the cueing time in the measurement-target node to detect a congestion state on the transmission system leading to the measurement-target node from the measurement main body via the prior node through computing a difference between the recorded received times of each of the response messages.

5. A non-transitory computer readable storage medium storing a call processing time measuring program for executing controls to detect a state of a measurement-target node by transmitting a message from a measurement main body towards a plurality of measurement-target nodes linked through a transmitting system and receiving a response for the message, for causing a computer to execute the functions of:

detecting, as the message, a measurement-target message used for measuring time required to process the message in the measurement-target node;

transmitting the measurement-target message including a response request message right before and right after the measurement-target message, upon detecting the measurement-target message to the measurement-target node, or to the measurement-target node via a node that is not the measurement-target node;

recording received time of each response message responded to each of the response request messages transmitted by the measurement-target node and discriminating information of the measurement-target message; and measuring the time required to process the message in the measurement-target node to detect a congestion state on the transmission system leading to the measurement-target node from the measurement main body through detecting a difference between the recorded received times of each of the response messages.

6. A non-transitory computer readable storage medium storing a call processing time measuring program for executing controls to detect a state of a measurement-target node by transmitting a message from a measurement main body towards a plurality of measurement-target nodes linked through a transmitting system and receiving a response for the message, for causing a computer to execute the functions of:

detecting a measurement-target message from the measurement main body used for measuring cueing time that is from reception of the measurement-target message to start of the processing in the measurement-target node;

transmitting a response request message right before the measurement-target message and transmitting a response request message to a prior node which transfers the message to the measurement-target node, upon detecting the measurement-target message;

recording received time of each response message responded to each of the response request messages transmitted by the measurement-target node and the prior node; and measuring the cueing time in the measurement-target node to detect a congestion state on the transmission system leading to the measurement-target node from the measurement main body via the prior node through computing a difference between the recorded received times of each of the response messages.

* * * * *